United States Patent [19]

Burns et al.

[11] 3,988,140

[45] Oct. 26, 1976

[54] PROCESS FOR MAKING STABLE SLUDGE-FREE AMMONIUM POLYPHOSPHATE FERTILIZER SOLUTIONS

[76] Inventors: Tom V. Burns, 1312 Kathleen St., Metairie, La. 70003; Sergio Ortega Pierres, Anaxagoras 430, Mexico City, Mexico

[22] Filed: Jan. 30, 1975

[21] Appl. No.: 545,523

[52] U.S. Cl. .................................. 71/34; 71/43; 71/64 C; 423/310; 423/313; 423/315
[51] Int. Cl.² .......................................... C05B 7/00
[58] Field of Search ................. 71/34, 43, 64 C; 423/310, 313, 315

[56] References Cited
UNITED STATES PATENTS

| 3,264,087 | 8/1966 | Slack et al. | 71/43 |
| 3,734,708 | 5/1973 | Burns | 71/34 |

Primary Examiner—Charles N. Hart
Assistant Examiner—Ferris H. Lander
Attorney, Agent, or Firm—Larson, Taylor and Hinds

[57] ABSTRACT

Stable sludge-free ammonium polyphosphate fertilizer solution is prepared by introducing ammonia and a blend of impure wet process phosphoric acid having a $P_2O_5$ content of 58 to 68% and solvent extracted wet process phosphoric acid of reduced $Fe_2O_3$, $Al_2O_3$, MgO and free $H_2O$ content into a reactor wherein the mixed reactants are retained for at least about 0.10 second after which the reaction product is immediately quenched and the resulting solution aged to effect precipitation and nucleation of suspended insoluble metallic phosphates and insoluble organic matter, and filtered.

9 Claims, 2 Drawing Figures

PROCESS FOR MAKING STABLE SLUDGE-FREE AMMONIUM POLYPHOSPHATE FERTILIZER SOLUTIONS

BACKGROUND OF THE INVENTION

This invention relates to a process for producing stable, sludge-free ammonium polyphosphate fertilizer solutions.

It is well known that ammonium phosphate fertilizers may be produced by the reaction of ammonia and phosphoric acid to produce ammonium phosphate. Ammonia for use in such reactions is readily available in comparatively pure form. However, phosphoric acid is available in several grades with varying degrees of purity. Because of the economics involved, wet-process grade phosphoric acid is ordinarily used in the production of fertilizers since wet-process acid is much less expensive than the other grades.

Characteristically, wet-process orthophosphoric acid contains relatively large amounts of dissolved impurities such as calcium sulfates, fluorides and fluorosilicates, aluminum, magnesium, iron and other metals. In commercial 54% $P_2O_5$ acid, these impurities may comprise between about one and ten weight percent. When such orthophosphoric acid is treated with ammonia to form either mono- or di-ammonium phosphate, or a mixture of both, the metallic impurities are precipitated. The iron and aluminum impurities are particularly troublesome as they form gelatinous precipitates which are substantially impossible to separate from the aqueous phase by ordinary methods. When iron and aluminum are present in amounts greater than about three percent, the entire aqueous phase often gels into a solid mass.

The precipitates ordinarily do not interfere with the phytonutritive value of ammonium phosphate. Conversely, they are considered to have fertilizing value of their own. However, they tend to settle to the bottom of the storage vessels and clog pipe lines and other equipment used for applying the liquid product to the soil. Because of the precipitates formed by the impurities, ammonium phosphate made from wet-process acid for fertilizer purposes is often manufactured, marketed and applied in the solid form. However, evaporating the aqueous material to produce a dry product together with packaging and otherwise handling the product may substantially increase the cost of ammonium phosphate fertilizers manufactured from wet-process acid.

It has been discovered that some of the impurities which are found in wet-process orthophosphoric can be maintained in fertilizer solutions by the introduction of colloidal clays or other materials which maintain the precipitate in solution or suspension. However, the use of colloidal clays and the like is an expensive and involved process. It has also been discovered that reaction of ammonia with superphosphoric acid (phosphoric acid containing slightly more than 50% non-ortho forms of phosphoric acid such as pyro, meta, tri and higher forms) yields a high percentage of polyphosphates. High polysuperphosphoric acid, like the use of colloidal clays, however, is expensive.

Attempts have been made to reduce the concentration of precipitates in ammonium phosphate solutions produced by the ammoniation of wet-phosphoric acid or regular merchant grade phosphoric acid by increasing the polyphosphate content of the solutions. It has been found, however, that this technique has not been completely able to provide the sludge-free ammonium polyphosphate solutions even at polyphosphate conversion levels as high as 60%. Therefore, if the production of stable, sludge-free ammonium polyphosphate is desired, it has been necessary to utilize high polysuperphosphoric acid which as aforementioned is an expensive form of the acid. When the reaction with the anhydrous ammonia takes place in the ammonium phosphate production a considerable amount of heat is evolved. Consequently, the reaction system must be cooled down since the high temperatures involved will hydrolyze the desirable non-ortho phosphate back to orthophosphates according to the following reaction:

$$(NH_4)_2H_2P_2O_7 + \text{water} \rightarrow 2NH_4H_2PO_4$$

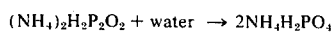

It is an object of the present invention to produce clear, sludge-free ammonium polyphosphate solutions starting with wet-process phosphoric acid.

Another object of the invention is to produce ammonium polyphosphate solutions which do not require the heretofore high levels, e.g. 70% or more, of polyphosphate content to provide a stable, sludge-free solution.

Yet another object of the invention is to provide an ammonium polyphosphate solution of improved sequestration powers.

BRIEF SUMMARY OF THE INVENTION

These and other objects of the invention are obtained by introducing a blend of impure wet-phosphoric acid having a $P_2O_5$ content of from about 58 to 68% and a solvent extracted wet-phosphoric acid of reduced $Fe_2O_3$, $Al_2O_3$, MgO and free $H_2O$ content, said acid blend comprising:

| | |
|---|---|
| $P_2O_5$ | ≧ about 59% |
| CaO | up to about .06% |
| $SO_4$ | up to about 3.5% |
| F | up to about 0.28% |
| $Fe_2O_3$ | up to about 0.35% |
| $Al_2O_3$ | up to about 0.45% |
| MgO | up to about 0.35% |
| Free Water | up to about 14.0% |
| S.G at 60/60 | up to about 1.720% | introducing ammonium vapor into said mixing zone in an amount of from about 0.8 to 1.2 moles per mole of phosphoric acid. The mixed acid blend and ammonia are then conveyed through a reaction zone maintained at a temperature of 560° to 600° F for at least about 0.10 second to effect reaction between the acid blend and ammonia. The reaction product comprises a hot melt ammonia polyphosphate which is substantially immediately quenched to provide a solution comprising ammonium polyphosphate, at least 55% of the $P_2O_5$ content of which is in the non-orthophosphate form and sequestered insoluble metallic phosphates and insoluble organic materials as solid finely divided impurities, aging the resulting solution to effect precipitation and nucleation of said insolubles into filterable form and filtering the aged solution to provide said stable, sludge-free ammonium polyphosphate solution.

The process is preferably carried out in apparatus comprising a tee mixing chamber including first and second inlet arms disposed at 180° with respect to one another and an outlet arm set at about 90° with respect to said inlet arms, means for introducing ammonia into said mixing chamber through said first inlet arm of said tee, means for introducing impure wet-process phosphoric acid into said mixing chamber through said second inlet arm of said tee, a reaction zone adjacent to said mixing tee comprising an elongate conduit having an inlet end adjacent to and in fluid communication with the outlet arm of said mixing tee, said conduit being preferably substantially U or L-shaped and having an outlet end, means for maintaining the temperature of said reaction conduit at a temperature of from 560° to 600° F, and a quench chamber containing water located adjacent to and in fluid communication with the outlet end of said reaction conduit for quenching ammonium phosphate reaction product introduced thereto from said reaction conduit.

The filter product of the present invention is a clear, green sludge-free polyphosphate solution which will store for a minimum of three months at 70° F without excess post precipitation. In this regard, the process of the invention has been found to be unique in that the polyphosphate distribution in the solution produced indicates an average of about 20% or 25% more conversion of higher species polyphosphates than other similar processes as a result of which a polyphosphate solution of improved metal impurity sequestration powers results.

Another unique feature of the present invention is that it permits removal by filtering of all non-sequestered suspended insoluble solids and deactivated black carbon coloring particles from polyphosphate solutions to provide a final, clear sludge-free green liquid. Such has been very difficult if not impossible to obtain when merchant grade wet-process phosphoric acid is employed in the ammoniation. The insoluble materials in the ammonium polyphosphates are compounds of iron and aluminum introduced in large part by the wet-process phosphoric acid. The amounts of insoluble materials are minimized by the present invention by carrying out the ammoniation of the acid blend as rapidly as possible as well as avoiding the accumulation of nuclei seeds or crystals of the insoluble compounds in the storage of the finished product. The rapid speed features of the present invention are capable of providing an average of 99.8% conversion of ammonium polyphosphates to water and citric acid soluble materials.

In general, about 0.2% of the insoluble compounds in the ammonium polyphosphate produced are members of the isomorphus series (Fe, Al) $NH_4P_2O_7$ and further dimorphs' of Mg, Al $(NH_4)_5 (P_2O_7)_2F_2 \cdot 6H_2O$. In accordance with the present invention these insoluble materials are able to nucleate and seed in the solution to a filterable form by solubilizing and aging the fresh production for about 10 to 20 days. Unlike prior art processes wherein aging results in an unfilterable mixture the process of the invention permits crystal growth to a size which permits effective removal by commercial filtration systems and at the same time removes color bodies or deactive organic carbon materials frequently present in the product.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

Figure 1:
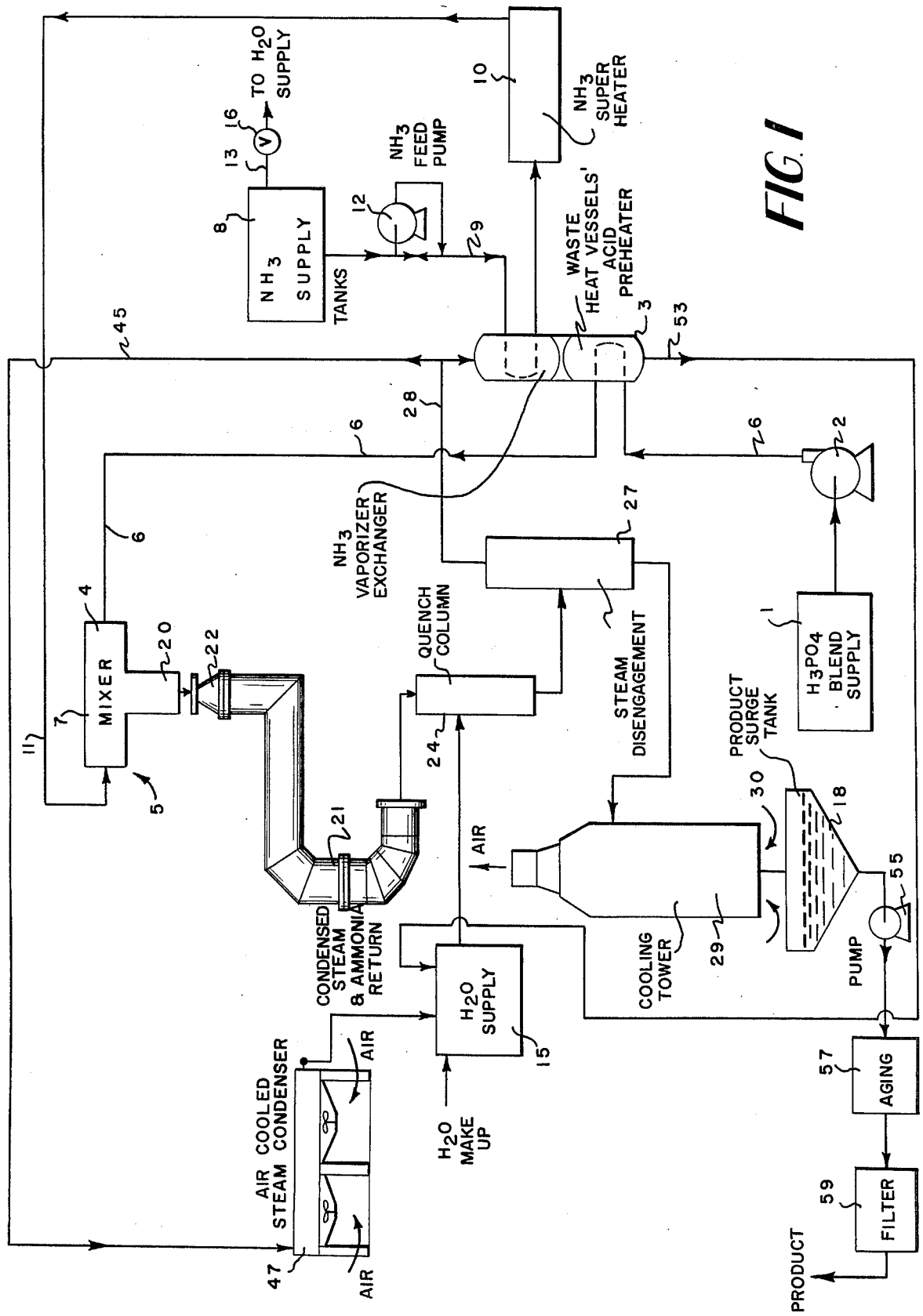
Figure 2:
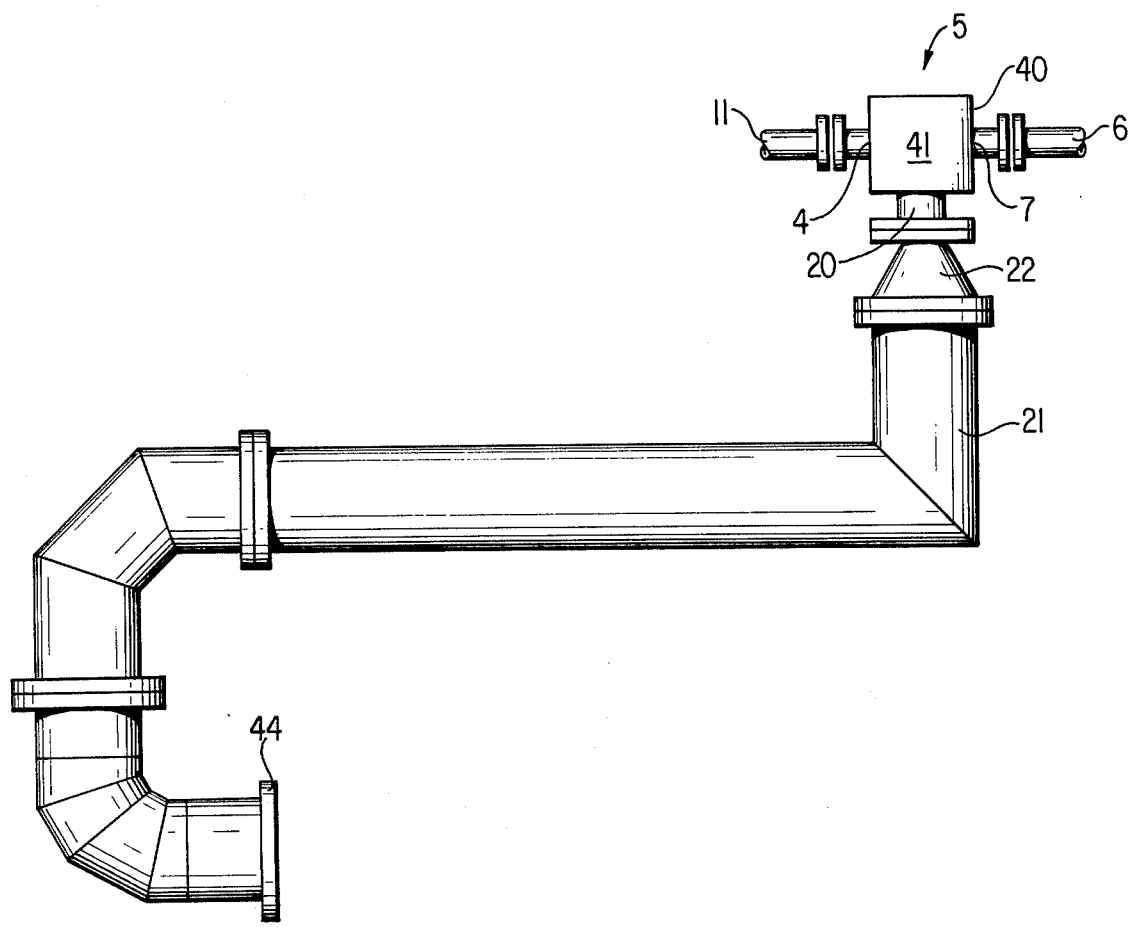

FIG. 1 is a diagrammatic flow sheet illustrating the method according to the present invention; and FIG. 2 is a sectional view of a tee mixer and reaction chamber useful in the process and apparatus of FIG. 1.

The solvent extracted wet-process phosphoric acid component employed in the process of the present invention is obtained by contacting wet-process phosphoric acid with a solvent selective for phosphoric acid. Illustrative of such solvents are alkyl ethers such as isopropyl ether, and alcohols such as heptanol, octanol, etc. In general, the extraction is conducted in a liquid-liquid contacting vessel wherein phosphoric acid is selectively transferred to the solvent phase leaving a residual water phase containing the bulk of impurities. The proportions of solvent to acid are utilized and the temperatures at which the solvent extraction is conducted varies with the particular wet phosphoric acid and solvent employed. In general, employing a 54% $P_2O_5$ phosphoric acid solution a proportion of solvent to acid solution of approximately 2 to 1 and contact temperatures of about 3° to 5° C will ordinarily provide a solvent extracted phosphoric acid component of sufficiently reduced $Fe_2O_3$, $Al_2O_3$, MgO and free $H_2O$ content to provide on blending with the wet phosphoric acid a phosphoric acid blend having the prescribed constituency.

An isopropyl ether extracted wet process phosphoric acid component suitable for use in the present invention can be obtained, for instance, by mixing in a liquid-liquid contact vessel isopropyl ether and wet-process phosphoric acid having the analysis described above in a solvent to acid ratio of 2:1 at a temperature of 3°–5° C. The solvent/acid is transferred from the mixing vessel to a liquid-liquid separator wherein the mixture settles into an upper extract phase and lower residual acid phase. The extract phase is then directed after heating to a vessel wherein the solvent/extract mixture is permitted to settle into a solvent upper phase and an extract lower phase. The extract phase is further cleaned and transferred into a second liquid-liquid separator wherein the extract phase settles into an upper solvent phase and a clean acid lower phase. The clean acid lower phase is then directed into a solvent steam stripper for removal of the solvent. The resulting isopropyl ether extracted wet process phosphoric acid comprises:

| | |
|---|---|
| $P_2O_5$ | 60% |
| CaO | 14 p.p.m. |
| $SO_4$ | 3.0% |
| F | 900 p.p.m. |
| $Fe_2O_3$ | 142 p.p.m. |
| $Al_2O_3$ | 16 p.p.m. |
| MgO | 16 p.p.m. |
| Free Water | 13.5% |
| S.G. at 60/60 | 1.700 |
| Organic Carbon | 100 p.p.m. |

The proportions of wet phosphoric acid to solvent extracted acid will vary of course depending upon the particular components blended. The only essential criteria is that the solvent extracted acid be sufficiently reduced $Fe_2O_3$, $Al_2O_3$, MgO and $H_2O$ content and blended with the wet phosphoric acid in sufficient amounts to provide a blend of the defined constituency. By way of illustration blending of one part of the above described isopropyl ether extracted wet process phosphoric acid with one part of a wet process phosphoric acid comprising:

| | |
|---|---|
| $P_2O_5$ | 59% |
| CaO | 0.12% |
| $SO_4$ | 4.0% |
| F | 0.6% |
| $Fe_2O_3$ | 0.66% |
| $Al_2O_3$ | 0.60% |
| MgO | 0.60% |
| Free Water | 13.5% |
| S.G. at 60/60 | 1.760 |
| Organic Carbon | 900 p.p.m. | provides a phosphoric acid blend comprising:

| | |
|---|---|
| $P_2O_5$ | 60% |
| CaO | 0.06% |
| $SO_4$ | 3.50% |
| F | 0.28% |
| $Fe_2O_3$ | 0.33% |
| $Al_2O_3$ | 0.30% |
| MgO | 0.30% |
| Free Water | 13.50% |
| S.G. at 60°/60° F | 1.730 |
| Organic Carbon | 0.04% |
| Suspended Solids | 0.50% |

The phosphoric acid blend thus obtained is placed in a tank 1 or other source of supply from where it is pumped by pump 2 through waste heat vessels 3 to a first inlet arm 4 of tee mixer 5. The acid is preferably heated to a minimum temperature of about 200° F for introduction into mixing tee 5 at that temperature and this is preferably accomplished by using waste heat from the reaction with ammonia to be described below. Waste heat, in the form of steam, is introduced into the top of heat exchanger vessel 3 and the acid feed from supply 1 is pumped by pump 2 through conduit 6 a portion of which passes through vessel 3. Vessel 3 may be any conventional indirect heat exchanger of proper materials of construction.

Ammonia is introduced into mixing tee 5 through a second arm 7 arranged opposite arm 4 such that the ammonia and phosphoric acid are introduced into the mixing zone from opposite directions about 180° apart. The ammonia is preferably introduced at a temperature of from 600° to 700° F and is conveniently heated by pumping ammonia from supply tank 8 by means of ammonia feed pump 12 through conduit 9 into waste heat vessels 3 where the ammonia is vaporized and heated to about 150° F. The ammonia vapor is then superheated further in superheater 10, which is a conveniently gas-fired heater, and is introduced into the mixing tee through conduit 11 at about 600° to 700° F.

In order to ensure thorough mixing, the acid and ammonia streams are introduced into the mixing zone from opposite directions and the ammonia is preferably introduced at a velocity of preferably at least 500 feet per second.

The mixed acid and ammonia leaves the mixing tee through arm 20 set at an angle of about 90° with respect to arms 4 and 7 and is immediately introduced into reactor 21. Reactor 21 is an elongate L-shaped conduit having its inlet end 22 adjacent to and in fluid communication with the outlet arm 20 of the mixing tee and having its outlet end 23 adjacent the inlet end of a quench column 24. The structure and arrangement of mixing tee 20 and reactor 21 constitute important aspects of the invention. In order to convert a substantial portion of the $P_2O_5$ in the acid to the polyphosphate or non-orthophosphate form, the residence time should be at least about 0.1 second but not so long as to cause substantial hydrolysis of the polyphosphate formed to orthophosphate thereby reducing the conversion of polyphosphate. Preferred residence times at a reaction temperature of about 560° to 600° F fall in the range of about 0.1 to 0.5 second. Residence times below about 0.1 do not provide sufficient conversion while at residence times greater than 0.5 second no advantage is gained in so doing for no appreciable change in conversion levels is ordinarily obtained. For example, utilizing a phosphoric acid having a $P_2O_5$ content of 60% and operating with a reactor minimum residence time of 0.11 second according to the invention will yield a product with about 60% $P_2O_5$ conversion to polyphosphate.

The reaction is exothermic and the reactants are preheated as indicated to maintain the reaction at a temperature of 560°–600° F without adding or removing heat. However, the ratio of the reactants and their temperatures may be varied to accomodate variations in process conditions. The temperature of the reactants may be controlled, for instance, by a series of heat exchangers.

The ammonia is introduced into the mixing tee in an amount of from 0.8 to 1.2 moles per mole of $P_2O_5$.

The preferred reaction zone is a curved, U-shaped or L-shaped path provided by U-shaped or L-shaped conduit 25 forming loop reactor 21. The reaction product emerging from the outlet end 23 of the reactor comprises a mixture of steam, melt, and unreacted ammonia. The ratio of nitrogen to $P_2O_5$ in the melt is at least 0.21.

The melt emerging from outlet 23 of reactor loop 21 is substantially immediately quenched with recycled steam and water in quench column 24. Column 24 is preferably a conventional plate column having a plurality of orifice plates to achieve high turbulence and a homogeneous product. Water is introduced to quench column 24 from supply tank 15 through conduit 26.

During the quenching step, enough water is preferably added to form an 11-37-0 solution and to produce sufficient steam such that the product is cooled down to the boiling point of the 11-37-0 solution at 3–5 lbs/in² above or essentially at atmospheric pressure. The quenched product is introduced into a disengagement drum where steam is removed as overheads through conduit 28 for use in waste heater 3. The hot product is then introduced into a conventional air cooling tower 29 through which air is drawn upwardly as indicated by arrows 30 by a blower (not shown). Cooled 11-37-0 solution passes from the bottom of cooling tower 29 into product surge tank 18.

Excess steam with unreacted ammonia from the waste heat vessels are sent by line 45 to air cooled steam condensor 47. Condensed steam and ammonia from condenser 47 is passed to water supply 15. Condensate from waste heat vessels 3 is also directed by line 53 to water supply 15.

The pH of the product is controlled by the initial ratio of reactants introduced into mixing tee 5.

The product from surge tank 18 is then pumped by pump 55 into an aging tank 57 where it is permitted to solubilize and age for 10 to 20 days. The water insoluble and citrate insoluble fractions tend to precipitate and nucleate. The organic acid deactive carbon begins to agglomerate to a more filterable form. The solution is then sent to a filter 59 such as a pressure shell filter with leaves where the organic carbon and suspended solids are removed. This filtration produces a clear green 11-37-0 solution which stores for a minimum of three months at 70° F with a minimum of post precipitation.

Details of the mixing tee 5 and reactor 21 are shown in FIG. 2. Mixing tee 5 comprises a housing 40 enclosing a mixing chamber 41 having inlets 4 and 7 and outlet 20. Ammonia gas is introduced into chamber 41 through conduit 11. Phosphoric acid is introduced into chamber 41 through conduit 6.

The inlet end 22 of reactor 21 is adjacent the outlet 20 of mixing tee 5 and it will be seen that the mixed reactants are substantially immediately introduced into the reactor. The outlet end 23 of reactor 21 is preferably welded to a flange 44 for coupling to the upper portion of quench column 24.

The invention is illustrated in the Example which follows:

Blended phosphoric acid having the composition described above is introduced into inlet 7 of mixing tee 5 at a temperature of about 210° F. Ammonia preheated to about 650° F is introduced into inlet 4 at a high velocity and at a rate of about 1.0 mole per mole of $P_2O_5$ in the acid introduced. The temperature of the reaction zone during the reaction is 570°–585° F, and the residence time is 0.11 seconds min. The reaction melt is quenched as indicated above and the product is 11-37-0 fertilizer having a pH of about 6.0 which is aged for 10 to 20 days and filtered using a shell type pressure filter with leaves. The product included 60% by weight of its $P_2O_5$ in the polyphosphate form and exhibited the following polyphosphate distribution:

| | |
|---|---|
| tetra | 10.5% |
| pyro | 57.0% |
| tri | 30.2% |
| Average Deviation From theoretical | 30.2% |

The product is clear green and sludge free after 90 days of shelf life at 80° F.

It is claimed:
1. A process of preparing a stable, sludge-free ammonium polyphosphate fertilizer solution which comprises introducing a blend of impure wet process phosphoric acid having a $P_2O_5$ content of from about 58 to 68 percent by weight and a solvent extracted wet process phosphoric acid of reduced $Fe_2O_3$, $Al_2O_3$, MgO and free $H_2O$ content, the proportions of impure wet process phosphoric acid to solvent extracted wet process phosphoric acid providing a phosphoric acid blend containing the following materials in the defined amounts:

| | |
|---|---|
| $P_2O_5$ | about 59% |
| CaO | up to about .06% |
| $SO_4$ | up to about 3.5% |
| F | up to about 0.28% |

-continued

| | |
|---|---|
| $Fe_2O_3$ | up to about 0.35% |
| $Al_2O_3$ | up to about 0.45% |
| MgO | up to about 0.35% |
| Free Water | up to about 14.0% | said phosphoric acid having a S.G. at 60/60 up to about 1.7 into a mixing zone;

introducing ammonia vapor into said mixing zone in an amount of from about 0.8 to 1.2 moles per mole of phosphoric acid;

conveying said mixed acid blend and ammonia through a reaction zone maintained at a temperature of from 560° to 600° F for from at least 0.10 second to effect reaction between the acid bland and ammonia, the reaction product comprising a hot melt ammonia polyphosphate product; and substantially immediately quenching said hot melt to provide a solution comprising ammonium polyphosphate at least 50% of the $P_2O_5$ content of which is in the non-orthophosphate form and suspended insoluble metallic phosphates and insoluble organic materials as solid finely divided impurities, separating steam and unreacted ammonia from said solution of quenched product, condensing and recycling said steam and ammonia for use in said quenching step, aging the resulting solution for about 10 to 20 days to effect precipitation and nucleation of said insolubles into filterable form and filtering the aged solution to provide said stable, sludge-free ammonium polyphosphate solution.

2. The process of claim 1 wherein the solvent extracted wet process phosphoric acid component is an isopropyl ether-extracted wet process phosphoric acid.

3. The process of claim 1 wherein the mixing zone is provided in a mixing tee, the ammonia being introduced through a first arm of the tee, the phosphoric acid being introduced through a second arm disposed at 180° with respect to the first arm and the mixture being withdrawn through a third arm disposed at 90° with respect to said first and second arms.

4. The process of claim 3 wherein the residence time of the mixed reactants in said mixing tee is not more than about 0.04 seconds before introduction into said reaction zone.

5. The process of claim 1 wherein the acid blend is introduced into said reaction zone at a minimum temperature of about 200° F.

6. The process of claim 1 wherein the ammonia is introduced into said mixing zone at a temperature of 600° to 700° F.

7. The process of claim 1 wherein the hot melt is quenched by introducing hot melt withdrawn from the reaction zone substantially immediately into an aqueous solution to form a liquid fertilizer solution.

8. The process of claim 7 wherein said liquid fertilizer solution is about 11-37-0.

9. The process of claim 1 wherein the reaction zone is in the form of a curved, L-shaped conduit.

* * * * *